US012572310B2

(12) United States Patent
Guo

(10) Patent No.: US 12,572,310 B2
(45) Date of Patent: Mar. 10, 2026

(54) DATA STORAGE METHOD AND DATA PROCESSING DEVICE

(71) Applicant: Cloud Intelligence Assets Holding (Singapore) Private Limited, Singapore (SG)

(72) Inventor: Kaijie Guo, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/844,360

(22) PCT Filed: Mar. 1, 2023

(86) PCT No.: PCT/CN2023/078956
§ 371 (c)(1),
(2) Date: Sep. 5, 2024

(87) PCT Pub. No.: WO2023/169271
PCT Pub. Date: Sep. 14, 2023

(65) Prior Publication Data
US 2025/0181276 A1     Jun. 5, 2025

(30) Foreign Application Priority Data
Mar. 7, 2022     (CN) ......................... 202210217550.3

(51) Int. Cl.
*G06F 3/06* (2006.01)
(52) U.S. Cl.
CPC .......... *G06F 3/0664* (2013.01); *G06F 3/0604* (2013.01); *G06F 3/0673* (2013.01)
(58) Field of Classification Search
CPC .... G06F 3/0664; G06F 3/0604; G06F 3/0673; G06F 9/45558; G06F 2009/4557;
(Continued)

(56) References Cited

U.S. PATENT DOCUMENTS

2017/0005990 A1     1/2017  Birger et al.
2019/0102568 A1     4/2019  Hausauer et al.
(Continued)

FOREIGN PATENT DOCUMENTS

CN         111124616  A       5/2020
CN         113468563  A      10/2021
(Continued)

OTHER PUBLICATIONS

Extended European Search Report issued on Dec. 18, 2025 for European Patent Application No. 23765849.7.

*Primary Examiner* — Hosain T Alam
*Assistant Examiner* — Zubair Ahmed
(74) *Attorney, Agent, or Firm* — Volpe Koenig

(57)               ABSTRACT

A data storage method and a data processing device. The method comprises: a data processing module sends data plaintext to be stored to a virtual storage driving module in the virtual machine; the virtual storage driving module sends the data plaintext to be stored to a virtual storage execution module corresponding to the virtual machine; the virtual storage execution module sends the data plaintext to be stored to an encryption module; the encryption module encrypts the data plaintext to be stored, and returns obtained data ciphertext to be stored to the virtual storage execution module; and the virtual storage execution module constructs a storage message using the data ciphertext to be stored as a message payload and using a communication address of a bound remote storage device as a message destination address, and sends said message to a network card driving module.

20 Claims, 4 Drawing Sheets

(58) Field of Classification Search
  CPC . G06F 2009/45587; G06F 2009/45595; G06F
               3/0607; G06F 3/067; G06F 21/78; G06F
               21/602; G06F 9/547; G06F 2209/549
  USPC ................................................. 711/154, 100
  See application file for complete search history.

(56)                  References Cited

U.S. PATENT DOCUMENTS

| | | | |
|---|---|---|---|
| 2019/0294328 A1 | 9/2019 | Mummidi et al. | |
| 2020/0319812 A1* | 10/2020 | He | G06F 3/0665 |
| 2020/0372163 A1* | 11/2020 | Chung | G06F 16/1734 |
| 2021/0311643 A1* | 10/2021 | Shanbhogue | G06F 3/0622 |
| 2022/0100546 A1* | 3/2022 | Cherian | H04L 49/253 |
| 2023/0066427 A1* | 3/2023 | Aigner | G06F 21/53 |

FOREIGN PATENT DOCUMENTS

| | | | |
|---|---|---|---|
| CN | 113778320 A | 12/2021 | |
| CN | 114691034 A | 7/2022 | |
| WO | 2012057942 A1 | 5/2012 | |

* cited by examiner

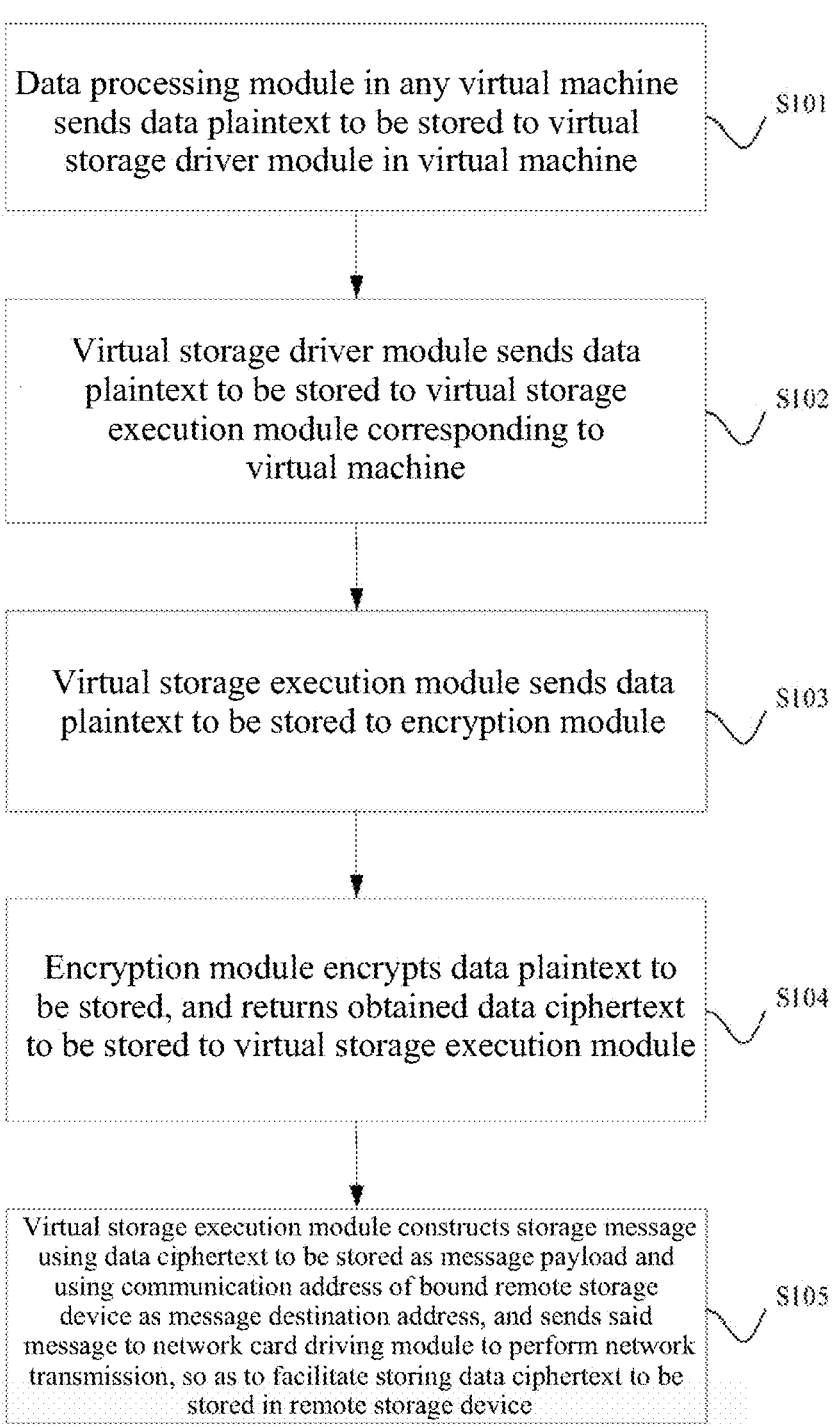

Data processing module in any virtual machine sends data plaintext to be stored to virtual storage driver module in virtual machine ⟶ S101

Virtual storage driver module sends data plaintext to be stored to virtual storage execution module corresponding to virtual machine ⟶ S102

Virtual storage execution module sends data plaintext to be stored to encryption module ⟶ S103

Encryption module encrypts data plaintext to be stored, and returns obtained data ciphertext to be stored to virtual storage execution module ⟶ S104

Virtual storage execution module constructs storage message using data ciphertext to be stored as message payload and using communication address of bound remote storage device as message destination address, and sends said message to network card driving module to perform network transmission, so as to facilitate storing data ciphertext to be stored in remote storage device ⟶ S105

FIG. 1

DATA STORAGE METHOD AND DATA PROCESSING DEVICE

CROSS-REFERENCE TO RELATED APPLICATION

The present application claims the priority of Chinese Patent Application No. 202210217550.3 filed with the China National Intellectual Property Administration on Mar. 7, 2022, entitled "DATA STORAGE METHOD AND DATA PROCESSING DEVICE", which is incorporated in the present disclosure by reference in its entirety.

TECHNICAL FIELD

Embodiments of the present specification relate to the field of computer technology, and in particular, to a data storage method and a data processing device.

BACKGROUND

Currently, users can use data processing services on the market to meet their data processing needs. Data processing service providers usually manage data processing devices. One or more virtual machines can be deployed on a data processing device, and the virtual machines provide users with an independent data processing environment.

SUMMARY

Embodiments of the present specification provide a data storage method and a data processing device. The technical solutions are as follows.

A data storage method, wherein at least one virtual machine is deployed on a data processing device, each virtual machine includes a data processing module and a virtual storage driver module, the virtual storage driver module is configured to drive a virtual storage execution module corresponding to the virtual machine, and the virtual storage execution module is bound to a non-local remote storage device; a network card of the data processing device includes a network card driver module, an encryption module and the virtual storage execution module corresponding to each virtual machine, the method including:

sending, by the data processing module of any virtual machine, plaintext of data to be stored to the virtual storage driver module in the virtual machine;

sending, by the virtual storage driver module, the plaintext of the data to be stored to the virtual storage execution module corresponding to the virtual machine;

sending, by the virtual storage execution module, the plaintext of the data to be stored to the encryption module;

encrypting, by the encryption module, the plaintext of the data to be stored, and sending obtained ciphertext of the data to be stored back to the virtual storage execution module; and constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

A data processing device, wherein at least one virtual machine is deployed on the data processing device, each virtual machine includes a data processing module and a virtual storage driver module, the virtual storage driver module is configured to drive a virtual storage execution module corresponding to the virtual machine, and the virtual storage execution module is bound to a non-local remote storage device; a network card of the data processing device includes a network card driver module, an encryption module and the virtual storage execution module corresponding to each virtual machine;

the data processing module in any virtual machines is configured to send plaintext of data to be stored to the virtual storage driver module in the virtual machine;

the virtual storage driver module is configured to send the plaintext of the data to be stored to the virtual storage execution module corresponding to the virtual machine;

the virtual storage execution module is configured to send the plaintext of the data to be stored to the encryption module;

the encryption module is configured to encrypt the plaintext of the data to be stored and send obtained ciphertext of the data to be stored back to the virtual storage execution module; and the virtual storage execution module is configured to construct a storage message using the ciphertext of the data to be stored as a message payload and a communication address of a bound remote storage device as a message destination address, and send the storage message to the network card driver module for network transmission, to store the ciphertext of the data to be stored in the remote storage device.

BRIEF DESCRIPTION OF THE DRAWINGS

In order to more clearly illustrate the embodiments of the present specification or the technical solutions in the prior art, the drawings required for use in the description of the embodiments or the prior art will be briefly introduced below. Obviously, the drawings described below are only some embodiments recorded in the embodiments of the present specification. For a person having ordinary skill in the art, other drawings can also be obtained based on these drawings.

FIG. 1 is a schematic flow chart of a data transmission method provided in an embodiment of the present specification;

DETAILED DESCRIPTION

Figure 2:
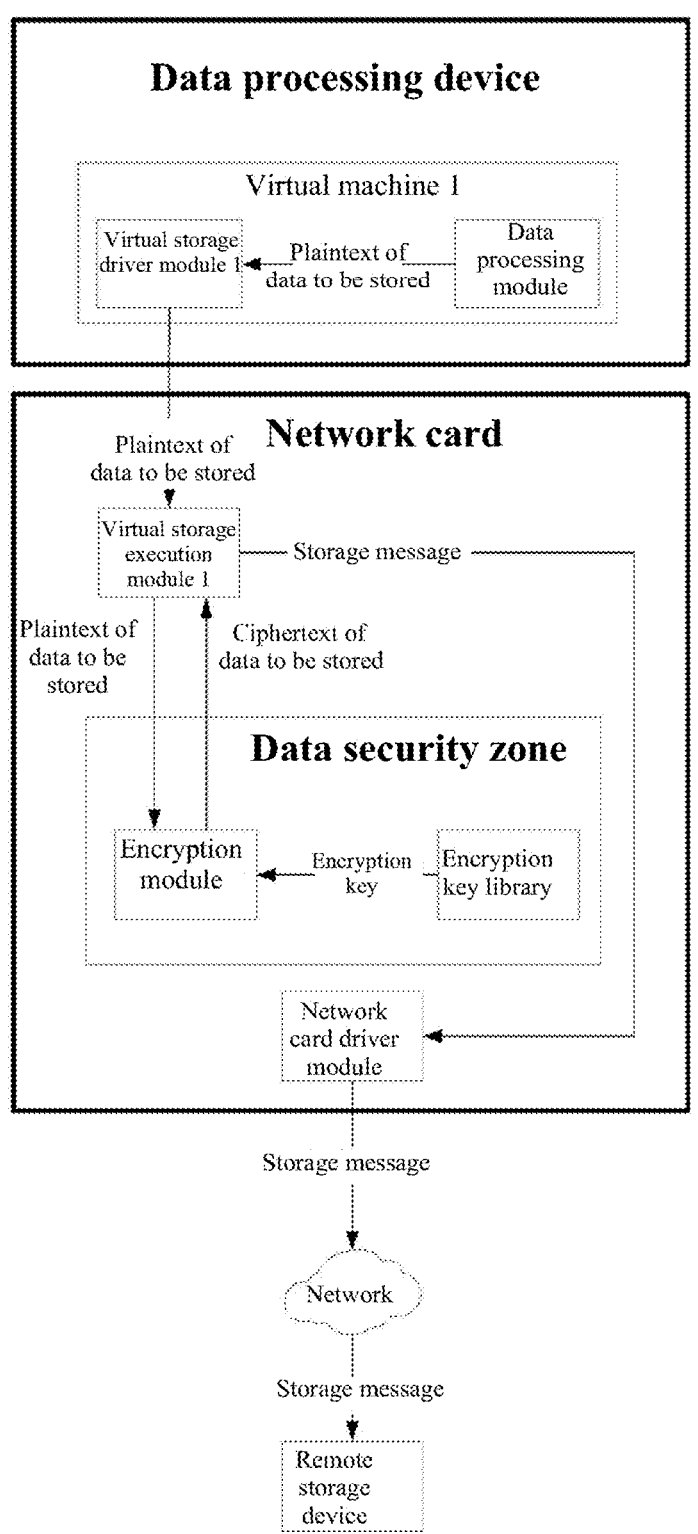
FIG. 2 is a schematic diagram of the principle of a data storage method provided in an embodiment of the present specification.

In order to enable those skilled in the art to better understand the technical solutions in the embodiments of the present specification, the technical solutions in the embodiments of the present specification will be described in detail below in conjunction with the drawings in the embodiments of the present specification. Obviously, the described embodiments are only part of the embodiments of the present specification, rather than all of the embodiments. All other embodiments obtained by a person having ordinary skill in the art based on the embodiments in the present specification should fall within the scope of the disclosure.

Currently, users can use data processing services on the market to meet their data processing needs. Data processing service providers usually manage data processing devices. One or more virtual machines can be deployed on a data processing device, and the virtual machines provide users with an independent data processing environment.

Data processing modules used in virtual machines to execute data processing processes sometimes have data storage requirements, while local storage space of the data processing devices may not be suitable for the virtual machines, or the data processing devices do not have local storage space.

The local storage space of the data processing devices may have unstable issues and prone to data loss. Alternatively, it may have unreliability issues, and the storage space specific to a virtual machine may be easily accessed by other virtual machines other than the virtual machine, causing data privacy leakage; or it may have issues of inconvenient unified storage management.

For example, different virtual machines require different amounts of data storage space. Directly allocating the same amount of storage space to each virtual machine can easily lead to a waste of resources. Dynamically allocating storage space to virtual machines also increases the complexity of storage space.

The data processing device itself may also not have local storage space, but is specific to data processing. For example, the data processing device can be a computing node decoupled from a storage node, and the local storage space can be a disk.

Therefore, the data processing module of the virtual machine is often unable to store data in the local storage space of the data processing device. Therefore, a data storage solution provided to the virtual machines deployed on the data processing device is needed.

In order to solve the above technical problems, embodiments of the present specification provide a data storage method and a data processing device. The technical solutions are as follows.

Specifically, the embodiments of the present specification disclose a data storage solution provided for use by virtual machines deployed on a data processing device.

In an optional data storage solution, a remote storage device other than the data processing device can be bound to each virtual machine on the data processing device, so that data required to be stored by the data processing module of the virtual machine can be stored in the remote storage device.

Specifically, the data processing module in each virtual machine can manage the communication address of the remote storage device bound to the virtual machine, construct a message using the data to be stored as the payload and the communication address of the remote storage device as the destination address, and send the message to the network through the network card on the data processing device, so as to enable the remote storage device to store the data to be stored in the message payload locally on the remote storage device after receiving the message.

However, in this data storage solution, the data processing module of the virtual machine, in addition to performing its own data processing task, needs to take on the additional task of managing the communication address of the remote storage device and the additional task of constructing a message, which consumes the computing resources of the data processing module and reduces the efficiency of the virtual machine's data processing.

Moreover, from the user's perspective, the user uses a virtual machine in order to use the virtual machine's computing resources to meet data processing needs. If the data processing module in the virtual machine consumes more computing resources to achieve remote data storage, it will reduce data processing efficiency and also reduce the user's experience of using data processing services.

In another optional data storage solution, a special network card loaded on the data processing device can be used. This network card replaces the data processing module of the virtual machine and takes on the task of managing the communication address of the remote storage device and the task of constructing the message, so that the data processing module in the virtual machine can focus on performing its own data processing task and improve data processing efficiency.

In the present solution, a virtual storage execution module can be deployed on the network card, and the virtual storage execution module can perform actual remote data storage operations, specifically, it can take on the task of managing the communication address of the remote storage device and the task of constructing the message.

One virtual storage driver module can be loaded in the virtual machine to drive the virtual storage execution module on the network card.

For a virtual machine, the virtual storage execution module driven by the virtual storage driver module can be regarded as a virtualized local storage space. The data processing module can directly send the data to be stored to the virtual storage driver module, so that the virtual storage driver module can store the data in the virtualized local storage space of the virtual storage execution module without performing other operations.

Of course, the virtual storage execution module is not an actual storage space, but a functional module for executing remote data storage, which can send the obtained data to be stored to a remote storage device.

The virtual storage execution module can determine the corresponding remote storage device communication address for the data to be stored received from the virtual storage driver module, and then construct a message with the data to be stored as the payload and the communication address of the remote storage device as the destination address, and then send the message to the network card driver module in the network card for network transmission, so as to enable the remote storage device to store the data to be stored in the message payload locally on the remote storage device after receiving the message.

Therefore, in the present solution, a special network card can be used to share the task of remote data storage with the virtual machine, so that the data processing module of the virtual machine can focus on performing its own data processing task, which can save the computing resources of the virtual machine, improve data processing efficiency, and enhance the user's experience of using data processing services.

It should be noted that the special network card in the present solution has good pluggability and does not require excessive changes to the data processing device and the virtual machine.

For a data processing device, it is only necessary to load this special network card and to load a virtual storage driver module in the virtual machine to achieve remote storage. Moreover, the virtual machine can regard the virtual storage execution module as a virtualized local storage space, and the data processing module can directly send the data to be stored to the virtual storage driver module used to drive this virtualized local storage space. Therefore, the usage logic for the virtual storage driver module in the virtual machine is also very simple, and the change cost is low.

Furthermore, in the present solution, the virtual storage execution module can be used to easily expand storage resources, specifically by adding a remote storage device for remote data storage, or replacing a remote storage device with a larger storage space.

Therefore, the present solution can easily achieve storage resource expansion from the software level without the need for complex expansion operations at the hardware level, for example, adding disk hardware locally to the data processing device, configuring the disk, etc.

Furthermore, in order to improve the security of data in remote storage and the security during data transmission, the data processing module of the virtual machine generally needs to encrypt the plaintext of the data to be stored, and then send the obtained ciphertext of the data to the remote storage device for storage. Obviously, this method will also consume the computing resources of the virtual machine.

Therefore, based on the above-mentioned special network card, the network card can further encrypt the data to be stored before sending it to the remote storage device.

Specifically, an encryption module can be deployed in the network card. After the virtual storage execution module obtains the plaintext of the data to be stored, it can first use the encryption module to encrypt the plaintext of the data to be stored. After obtaining the ciphertext of the data sent back by the encryption module, it constructs a message using the ciphertext of the data to be stored as the payload and the corresponding remote storage device communication address as the destination address, and then send the message to the network card driver module in the network card for network transmission, so as to enable the remote storage device to store the ciphertext of the data to be stored in the message payload locally on the remote storage device after receiving the message.

This approach can improve the security of data in remote storage and during data transmission without increasing the computing resource burden of the virtual machine. On one hand, it is the ciphertext of the data which is transmitted, so that the security of the process of data transmission to the remote storage device can be improved, on the other hand, it is also the ciphertext of date which is stored by the remote storage device and cannot be decrypted, so that the security of remotely stored data can be improved.

As shown in FIG. 1, it is a schematic diagram of a flow chart of a data storage method provided in an embodiment of the present specification.

At least one virtual machine can be deployed on the data processing device, each virtual machine can include a data processing module and a virtual storage driver module, the virtual storage driver module can be used to drive a virtual storage execution module corresponding to the virtual machine, and the virtual storage execution module can be bound to a non-local remote storage device.

A network card of the data processing device can include a network card driver module, an encryption module, and the virtual storage execution module corresponding to each virtual machine.

This method can include the following steps.

S101: sending, by a data processing module of any virtual machine, plaintext of data to be stored to the virtual storage driver module in the virtual machine.

S102: sending, by the virtual storage driver module, the plaintext of the data to be stored to the virtual storage execution module corresponding to the virtual machine.

S103: sending, by the virtual storage execution module, the plaintext of the data to be stored to the encryption module.

S104: encrypting, by the encryption module, the plaintext of the data to be stored, and sending obtained ciphertext of the data to be stored back to the virtual storage execution module.

S105: constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

In the above method flow, the data processing module of the virtual machine can send the data to be stored to the remote storage device for storage through the network card of the data processing device where it is located, specifically through the virtual storage execution module in the network card, thereby realizing remote storage and enabling the virtual machine to store data.

In addition, in the above method flow, the data processing device can load a special network card and use the virtual storage execution module in the network card to share the task of remote data storage for the virtual machine, so that the data processing module of the virtual machine can focus on performing its own data processing task, which can save the computing resources of the virtual machine, improve data processing efficiency, and improve the user's experience of using data processing services.

In addition, data encryption can be further performed through the virtual storage execution module on the network card to take on the data encryption task of the virtual machine, further saving the computing resources of the virtual machine, thereby improving the security of data in remote storage and during data transmission without increasing the computing resource burden of the virtual machine.

Since the data transmitted in the network is in ciphertext form, no additional encryption operations need to be performed during the data transmission process. For example, there is no need to perform additional transmission encryption through IPsec, etc., which can improve the efficiency of data transmission. In addition, the data stored in the external storage device is also in encrypted form. Devices that do not have the corresponding decryption key cannot obtain the plaintext of the data, thereby improving the security of the data in the remote storage process without increasing the burden on the virtual machine.

In addition, the remote storage device can directly store the received ciphertext of the data without other processing, and has good scalability.

The following is a detailed explanation of each step.

S101: sending, by a data processing module of any virtual machine, plaintext of data to be stored to the virtual storage driver module in the virtual machine.

In one optional embodiment, the plaintext of the data to be stored can be data related to the data processing module during the data processing process. For example, data processing results, data processing intermediate results, data processing logs, etc.

The data processing module needs to store at least part of the data due to data storage requirements. For example, it is necessary to store at least part of the data to a disk, but it is not desirable to store it locally on the data processing device.

Therefore, optionally, the data processing module can determine the at least part of the data as plaintext of the data to be stored, and directly send the plaintext of the data to be stored to the virtual storage driver module newly added in the virtual machine.

For virtual machines, they can be unaware of remote data storage and remote storage devices, and the virtual machines and remote storage devices are decoupled. The virtual machine can regard the virtual storage execution module driven by the virtual storage driver module as a virtualized local storage space, so that it only needs to send plaintext of data to be stored to the virtual storage driver module used to drive the virtualized local storage space.

In the present embodiment, a new virtual storage driver module can be loaded for the virtual machine. The function of the virtual storage driver module is relatively simple, and the use logic of the virtual storage driver module is also very simple. It only requires the data processing module to send the plaintext of the data to be stored to the virtual storage driver module. Therefore, the changes to the virtual machine can be simplified, and the task of remote data storage is mainly taken on by a special network card.

Optionally, the virtual storage driver module can specifically be a Virtio-blk driver. The virtual storage driver module can be used to drive the virtual storage execution module. Accordingly, the virtual storage execution module can specifically be Virtio-blk VF. Virtio-blk is a virtual disk technology. The Virtio-blk driver provides a callable virtual disk interface for the device's CPU, and the Virtio-blk VF can call non-device local disks through the network to implement local storage functions for the device.

S102: sending, by the virtual storage driver module, the plaintext of the data to be stored to the virtual storage execution module corresponding to the virtual machine.

Optionally, one virtual storage execution module can correspond to multiple virtual machines deployed on the data processing device.

This virtual storage execution module can be driven by virtual storage driver modules in multiple virtual machines to perform corresponding remote data storage tasks.

Optionally, the network card can include at least one virtual storage execution module, and different virtual machines can correspond one-to-one to different virtual storage execution modules. In other words, each virtual machine on the data processing device can correspond to a dedicated virtual storage execution module.

Specifically, different virtual storage execution modules can correspond one-to-one to different virtual storage driver modules, and each virtual storage execution module can only be driven by one corresponding virtual storage driver module. Therefore, the virtual machine can drive only one virtual storage execution module through the virtual storage driver module loaded by itself. Other virtual machines or other virtual storage driver modules cannot drive this virtual storage execution module.

In the present embodiment, each virtual machine can use a dedicated virtual storage execution module as a dedicated virtualized storage space, thereby achieving data isolation between different virtual machines to a certain extent, isolating the data that needs to be stored in the data processing modules in different virtual machines, and improving the security of the data in the virtual machines.

For example, if a plurality of virtual machines drive the same virtual storage execution module for remote data storage through different virtual storage driver modules, then for the data sent by the data processing module in one of the virtual machines to the virtual storage execution module, other virtual machines can also drive this virtual storage execution module through their own virtual storage driver modules to obtain the data of the virtual machine.

Therefore, by isolating the data that needs to be stored in the data processing modules in different virtual machines, it is possible to prevent other virtual machines or other devices from obtaining the data in the virtual machines, thereby improving the security of the data in the virtual machines.

Optionally, the virtual storage driver module can send plaintext of the data to be stored to the virtual storage execution module specific to the virtual machine. Since the virtual storage execution module is specific to the virtual machine, the security of the plaintext of the data to be stored can be improved.

S103: sending, by the virtual storage execution module, the plaintext of the data to be stored to the encryption module.

S104: encrypting, by the encryption module, the plaintext of the data to be stored, and sending obtained ciphertext of the data to be stored back to the virtual storage execution module.

S103 and S104 are explained below.

1) Regarding the encryption key specific to the virtual machine.

In one optional embodiment, the encryption module may use an encryption key to encrypt the plaintext of the data to be stored.

The method process does not limit the specific encryption method, and can specifically be a mainstream block storage encryption algorithm such as AES-CBC/AES-XTS.

Since one or more virtual machines can be deployed in the data processing device, optionally, different virtual machines can have different encryption keys, and different encryption keys can be used to encrypt data to be stored in respective data processing modules. In other words, each virtual machine on the data processing device can have a specific encryption key.

Since different encryption keys are used for encryption, if the ciphertext of the data stored remotely in a virtual machine is cracked, it will not affect the security of the ciphertext of the data stored remotely in other virtual machines, thereby improving the security of the plaintext of the data to be stored.

Optionally, at least two virtual machines can be deployed on the data processing device. The encrypting, by the encryption module, the plaintext of the data to be stored can include: encrypting, by the encryption module, the plaintext of the data to be stored by using an encryption key specific to the virtual machine.

The present embodiment can improve the security of plaintext of the data to be stored in the virtual machine through an encryption key specific to the virtual machine.

2) Regarding the specific form of the encryption key.

The method flow does not limit the specific form of the encryption key, and it can be a symmetric key or an asymmetric key.

It should be noted that in a case where the encryption key is a symmetric key, the encryption key is the same as the decryption key. Therefore, the network card that stores the virtual machine-specific encryption key has the ability to encrypt and store data and decrypt ciphertext of the data. In this case, improving the security of the virtual machine-specific encryption key can also improve the security of the virtual machine-specific decryption key.

3) Regarding data security zone.

In one optional embodiment, since the encryption key specific to each virtual machine is required to encrypt the plaintext of the data to be stored, the encryption key specific to each virtual machine is more important. If the encryption key is leaked, the corresponding decryption key may be cracked.

For example, in a case where the encryption key is a symmetric key, the encryption key and the decryption key are the same, and leakage of the encryption key also means leakage of the decryption key.

In order to improve the security of the encryption key specific to each virtual machine, a data security zone can be provided in a network card of the data processing device. It can be considered that the data in the data security zone can hardly be leaked out.

Optionally, the data security zone can be a zone where devices other than the network card cannot directly obtain data. The method flow does not limit the specific form of the data security zone, as long as the data in the data security zone can hardly be leaked. Optionally, the data security zone can construct a relatively independent storage area through hardware or software, and the input and output of data can be strictly controlled, thereby reducing the possibility of data leakage. A data security zone is, for example, a trusted execution environment, Intel software guard extensions (SGX), etc.

Accordingly, the encryption key specific to each virtual machine can be stored in the data security zone, thereby improving the security of the encryption keys specific to the virtual machine.

Optionally, the data security zone can specifically be a data security zone at the hardware level, which protects the encryption key specific to each virtual machine through hardware, thereby further improving the security of the encryption key specific to each virtual machine. The attacker's attack method is usually a software-level attack, and it is usually difficult to successfully attack the hardware-level data security zone.

Of course, in other optional embodiments, multiple virtual machines can use the same encryption key.

Therefore, optionally, the network card can have a data security zone at the hardware level, and the encryption key used by the encryption module can be stored in the data security zone.

Among others, the encryption key used by the encryption module can be an encryption key specific to each virtual machine, or can be the same encryption key used by multiple virtual machines.

It should be noted that a one-to-one correspondence between different virtual machines and different encryption keys can usually be stored in the data security zone, so that the specific encryption key corresponding to a certain virtual machine can be easily determined.

In the present embodiment, the encryption key can be stored in the hardware-level data security zone of the network card to achieve the effect of improving the security of the encryption key. That is, the encryption key for protecting the data will not appear in the memory and CPU Cache in plaintext, but will be encrypted using the encryption key in the hardware-level data security zone and does not need to appear in the memory and CPU Cache.

4) Regarding the specific form of the correspondence between the virtual machine and the encryption key.

The present embodiment does not limit the specific form of the correspondence between the virtual machine and the encryption key. It may be a correspondence between a virtual machine identifier and an encryption key, or, in the case where the virtual machine has a dedicated virtual storage execution module, the correspondence can specifically be a correspondence between a virtual storage execution module identifier and an encryption key.

Correspondingly, in a case where the correspondence between the virtual machine identifier and the encryption key is specifically the correspondence between the virtual machine identifier and the encryption key, S103: the sending, by the virtual storage execution module, plaintext of the data to be stored to the encryption module can also include determining, by the encryption module, an identifier of the virtual machine, which can specifically be obtaining, by the encryption module, the identifier of the virtual machine sent by the virtual storage execution module. The encrypting, by the encryption module, the plaintext of the data to be stored in S104 can specifically include: determining, by the encryption module, a corresponding encryption key according to the identifier of the virtual machine, and using the encryption key as the encryption key specific to the virtual machine to encrypt the plaintext of the data to be stored.

Correspondingly, in a case where the correspondence between the virtual machine identifier and the encryption key is specifically the correspondence between the virtual storage execution module identifier and the encryption key, S103: the sending, by the virtual storage execution module, plaintext of the data to be stored to the encryption module can also include determining, by the encryption module, this virtual storage execution module identifier. The encrypting, by the encryption module, the plaintext of the data to be stored in S104 can specifically include: determining, by the encryption module, a corresponding encryption key according to the virtual storage execution module identifier, and using the encryption key as the encryption key specific to the virtual machine to encrypt the plaintext of the data to be stored.

Optionally, in a case where the virtual machine has a dedicated virtual storage execution module, and the correspondence between the virtual machine identifier and the encryption key is specifically a correspondence between the virtual machine identifier and the encryption key, S103: the sending, by this virtual storage execution module, plaintext of the data to be stored to the encryption module can also specifically include: determining, by the encryption module, the corresponding virtual machine identifier based on this virtual storage execution module identifier. The encrypting, by the encryption module, the plaintext of the data to be stored in S104 can specifically include: determining, by the encryption module, a corresponding encryption key according to the identifier of the virtual machine, and using the encryption key as the encryption key specific to the virtual machine to encrypt the plaintext of the data to be stored.

5) The encryption module can also be deployed in the data security zone.

In one optional embodiment, in a case where the encryption key used by the encryption module is stored in the data security zone, the encryption module needs to use the encryption key to encrypt the plaintext of the data to be stored. Therefore, the encryption module needs to obtain the required encryption key from the data security zone. Specifically, it can be an encryption key specific to a virtual machine.

Optionally, the encryption module can also be deployed in the data security zone, thereby avoiding the encryption key from being transmitted outside the data security zone, further improving the security of the encryption key.

Furthermore, the steps performed by the encryption module will not be leaked, further improving the security of the encryption key.

Of course, in a case where the encryption module uses the encryption key specific to each virtual machine, the security of the encryption key specific to each virtual machine can also be improved.

In one optional embodiment, different virtual machines correspond one-to-one to different virtual storage execution modules, which can achieve the effect of data isolation between different virtual machines and improve the security of plaintext of the data to be stored.

Furthermore, in a case where the encryption module is deployed in the data security zone, the plaintext of the data to be stored will be directly encrypted in the data security zone during the encryption process, reducing the possibility of the encryption module leaking the plaintext of the data to be stored. Therefore, the effect of data isolation can be better achieved and the security of the plaintext of the data to be stored can be improved.

Specifically, no virtual machine can directly obtain data in the data security zone, nor can it obtain the plaintext of the data to be stored in the data security zone, nor can it call the encryption module to obtain the plaintext of the data to be stored of other virtual machines, thereby improving the security of the plaintext of the data to be stored.

In the present embodiment, since the virtual storage execution module is specific to the virtual machine, it can be regarded as a trusted area, and data encryption is performed by means of the data security zone, the plaintext of the data to be stored is always in the trusted area of the network card until the encryption is completed to obtain ciphertext of the data to be stored.

Therefore, the entire network card can be regarded as a data security zone, in which the plaintext of the data to be stored can hardly be leaked from the network card. The specific implementation method includes receiving the plaintext of the data to be stored by a virtual storage execution module specific to the virtual machine, and sending, by the virtual storage execution module, the plaintext of the data to be stored to an encryption module in the data security zone for encryption to obtain ciphertext of the data to be stored.

6) The encryption module can manage encryption keys.

In one optional embodiment, the encryption keys used by the encryption module can be used as an encryption key set, or an encryption key library, to facilitate calling by the encryption module.

Optionally, the encryption module can be used to manage the encryption key set, and specifically can be used to update the encryption key set, for example, adding an encryption key, deleting an encryption key, modifying a correspondence between a virtual machine and an encryption key, etc.

Take the example of an encryption module managing an encryption key specific to each virtual machine.

Optionally, the step of the encryption module managing an encryption key specific to each virtual machine can include at least one of the following: sending, in a case where it is determined that any virtual machine is migrated from a data processing device to another data processing devices, the encryption key specific to the virtual machine to the encryption module in the network card of the other data processing device; generating, in a case where it is determined that the data processing device creates any virtual machine, an encryption key specific to the virtual machine; deleting, in a case where it is determined that the data processing device deletes any virtual machine, the encryption key specific to the virtual machine.

Regarding encryption key migration.

Optionally, since the virtual machine typically already use specific encryption keys for remote data storage, in order to maintain key consistency of ciphertext of data and reduce the complexity of encryption and decryption, in a case where the virtual machine is migrated between data processing devices, the dedicated encryption key is typically required to be migrated to the network card of the new device.

Optionally, the network card of the other data processing device can also be the special network card in the process of the present method, and thus an encryption module is also deployed thereon, and such special network cards can communicate with each other. Therefore, hot migration can be achieved for the migrated virtual machine-specific encryption key.

It should be noted that the encryption key stored inside the network card is more secure and can prevent the encryption key from being leaked through a memory or cache in the virtual machine. For example, the network card can have a data security zone at the hardware level. Therefore, the encryption key specific to the migrated virtual machine can be followed directly through the interaction between network cards, that is, the communication between encryption modules, thereby improving the security of the encryption module during the migration process.

Optionally, between specific encryption modules, a secure connection or ciphertext form can be used for transmission, in order to improve the security of the encryption key specific to the virtual machine during transmission.

Therefore, optionally, in the case that any virtual machine needs to be migrated from a data processing device to another data processing device, the method further includes: sending, by the data processing module in the virtual machine, a migration notification to the virtual storage driver module in the virtual machine.

The virtual storage driver module sends the migration notification to the virtual storage execution module corresponding to the virtual machine.

The virtual storage execution module sends a key migration instruction to the encryption module according to the migration notification.

The encryption module encrypts a key corresponding to the virtual machine stored in the data security zone.

The encryption module constructs a key migration message using encrypted key as a message payload and a communication address of another encryption module in the network card of another data processing device to be migrated as a destination address, and sending the key migration message over network, facilitating decryption by the other encryption module to obtain the key.

Of course, the present embodiment does not limit the specific source of the migration notification, as long as the virtual storage execution module receives a migration notification of a certain virtual machine, which specifies the communication address of another encryption module in the network card of the other data processing device to be migrated.

The encryption key corresponding to the virtual machine can specifically be an encryption key specific to the virtual machine.

The present embodiment also does not limit the approach of encrypting and decrypting the key. An optional example is to use a public key of a network card of another data processing device to be migrated for encryption. The other encryption module can decrypt using the corresponding private key.

In the present embodiment, during virtual machine migration, the migration of the encryption key corresponding to the virtual machine is achieved through the interaction of special network cards between devices, so that the key consistency of ciphertext of data stored remotely in the virtual machine can be maintained. In addition, by encrypting the transmission key, the security of the encryption key during the migration process is improved.

Regarding encryption key creation.

Optionally, in a case where it is determined that the data processing device creates any virtual machine, the encryption module inside the network card directly generates an encryption key specific to the virtual machine, or generates an encryption key corresponding to the virtual machine.

There is no need for the virtual machine to participate in the encryption key generation process, which can improve the security of the encryption key and also make the virtual machine unaware of the encryption key. The present embodiment does not limit the method for generating the encryption key. Specifically, it can be a key derivation method.

Specifically determining that the data processing device creates a virtual machine can be to issue a control command to the created virtual machine after determining a virtual storage execution module corresponding to the virtual machine to notify the encryption module to generate a corresponding encryption key. This encryption key can be bound to the identifier of the virtual machine and stored in the encryption key library of the network card.

Regarding encryption key deletion.

Optionally, in a case where it is determined that the data processing device deletes any virtual machine, the encryption module can delete the encryption key specific to the virtual machine, or delete the encryption key corresponding to the virtual machine, thereby saving storage resources.

Optionally, in a case where it is determined that any virtual machine has been migrated from a data processing device to another data processing device, the encryption module can also delete the encryption key corresponding to the virtual machine after sending the encryption key corresponding to the virtual machine to the encryption module in the network card of the other data processing device, thereby saving storage resources.

S105: constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

Optionally, the remote storage device can be a cloud disk.

The network card driver module is mainly used to send messages, and specifically can be used to send messages according to a routing table.

In one optional embodiment, the ciphertext of data to be stored is sent to a remote storage device, which needs to store ciphertext of data to be stored locally on the device.

It should be noted that the virtual storage execution module can be bound to part of the storage area in the remote storage device to perform remote data storage, thereby making more efficient use of storage resources.

Therefore, this virtual storage execution module being bound to a non-local remote storage device can include: this virtual storage execution module being bound to a target storage space on a non-local remote storage device; wherein the message payload of the storage message further includes the address of the target storage space, so as to facilitate the storage of the ciphertext of data to be stored in the target storage space.

Correspondingly, the remote storage device where the target storage space is located can store ciphertext of data to be stored in the storage space represented by the space address according to the space address in the message payload.

Optionally, different virtual storage execution modules can be bound to different remote storage devices, and different virtual storage execution modules can be bound to different remote storage areas.

In one optional embodiment, different virtual storage execution modules can correspond one-to-one to different remote storage areas.

In the case where different virtual machines correspond one-to-one to different virtual storage execution modules, since the virtual storage execution module is bound to a dedicated remote storage area, it means that each virtual machine has a dedicated remote storage space.

This can further isolate ciphertext of data stored remotely in different virtual machines, thereby improving the security of data remotely stored.

Specifically, if a certain remote storage space is attacked, resulting in the leakage of ciphertext of data of the corresponding virtual machine, then the ciphertext of the data of other virtual machines will not be affected.

Therefore, the present embodiment can further achieve the effect of data isolation between different virtual machines by isolating the remotely stored data of different virtual machines, thereby improving the security of the ciphertext of the data to be stored.

For easier understanding, as shown in FIG. 2, it is a schematic diagram of the principle of a data storage method provided in an embodiment of the present specification.

The data processing device is deployed with virtual machines 1-3, each of which includes a data processing module and a virtual storage driver module.

A network card of the data processing device includes a virtual storage execution module 1-3, an encryption module, an encryption key library, and a network card driver module.

The virtual storage execution modules 1-3 can correspond one to one with the virtual machines 1-3. The network card also has a data security zone, and the encryption module and the encryption key library are deployed in the data security zone.

In addition to the data processing device, there is also a remote storage device.

FIG. 2 shows specific interaction between the modules.

The above method flow explains remote data storage.

The data processing module of the virtual machine also has a demand for using the stored data, and thus needs to read the stored data in the remote storage device.

Therefore, corresponding to the above method flow, it is also necessary to decrypt the ciphertext of the data read from the remote storage device.

Typically, the decryption can be performed by the virtual machine. In order to improve the data processing efficiency of the virtual machine, the ciphertext decryption can be performed by the virtual storage execution module in the network card. The encryption module is specifically an encryption and decryption module, which can perform both data encryption and data decryption.

Therefore, the above method flow can further include the following steps.

S201: sending, by the data processing module in any virtual machine, identification information corresponding to plaintext of data to be read to the virtual storage driver module in the virtual machine.

Optionally, the identification information corresponding to plaintext of data to be read can be an identifier of a data block.

S202: sending, by the virtual storage driver module, the identification information of the plaintext of the data to be read to the virtual storage execution module corresponding to the virtual machine.

S203: determining, by the virtual storage execution module, identification information of corresponding ciphertext of the data to be read according to the identification information of the plaintext of the data to be read.

Optionally, identification information corresponding to plaintext of data to be read can be directly determined as identification information of the corresponding ciphertext of the data to be read. Specifically, during encryption in the above method flow, only the data content is encrypted, but the data identification or data index is not encrypted. Therefore, the identification information of the data plaintext and the ciphertext of the data is the same.

S203: constructing, by the virtual storage execution module, a read request message using the identification information of the ciphertext of the data to be read as a message payload and a communication address of a bound remote storage device as a message destination address and sending the read request message to the network card driver module for network transmission.

S204: receiving, by the virtual storage execution module, a read feedback message sent by the network card driver module, wherein the read feedback message is constructed by the remote storage device and sent over network, and the message payload of the read feedback message includes the ciphertext of the data to be read.

S205: sending, by the virtual storage execution module, the ciphertext of the data to be read to the encryption and decryption module.

S206: decrypting, by the encryption and decryption module, the ciphertext of the data to be read and sending obtained plaintext of the data to be read back to the virtual storage execution module.

S207: sending, by the virtual storage execution module, the plaintext of the data to be read to the virtual storage driver module.

S208: sending, by the virtual storage driver module, the plaintext of the data to be read to the data processing module.

In one optional embodiment, at least two virtual machines can be deployed on the data processing device; the decrypting, by the encryption and decryption module, the ciphertext of the data to be read can include: the encryption and decryption module uses a decryption key specific to the virtual machine to encrypt the ciphertext data to be read.

In one optional embodiment, the network card can have a data security zone at the hardware level, and the decryption key used by the encryption and decryption module is stored in the data security zone. The encryption and decryption module can also be deployed in the data security zone.

For a detailed explanation of this method flow, reference can be made to the explanation of the above method flow S101-S105.

Regarding the decryption key, reference can be made to the above explanation of the encryption key.

Figure 3:
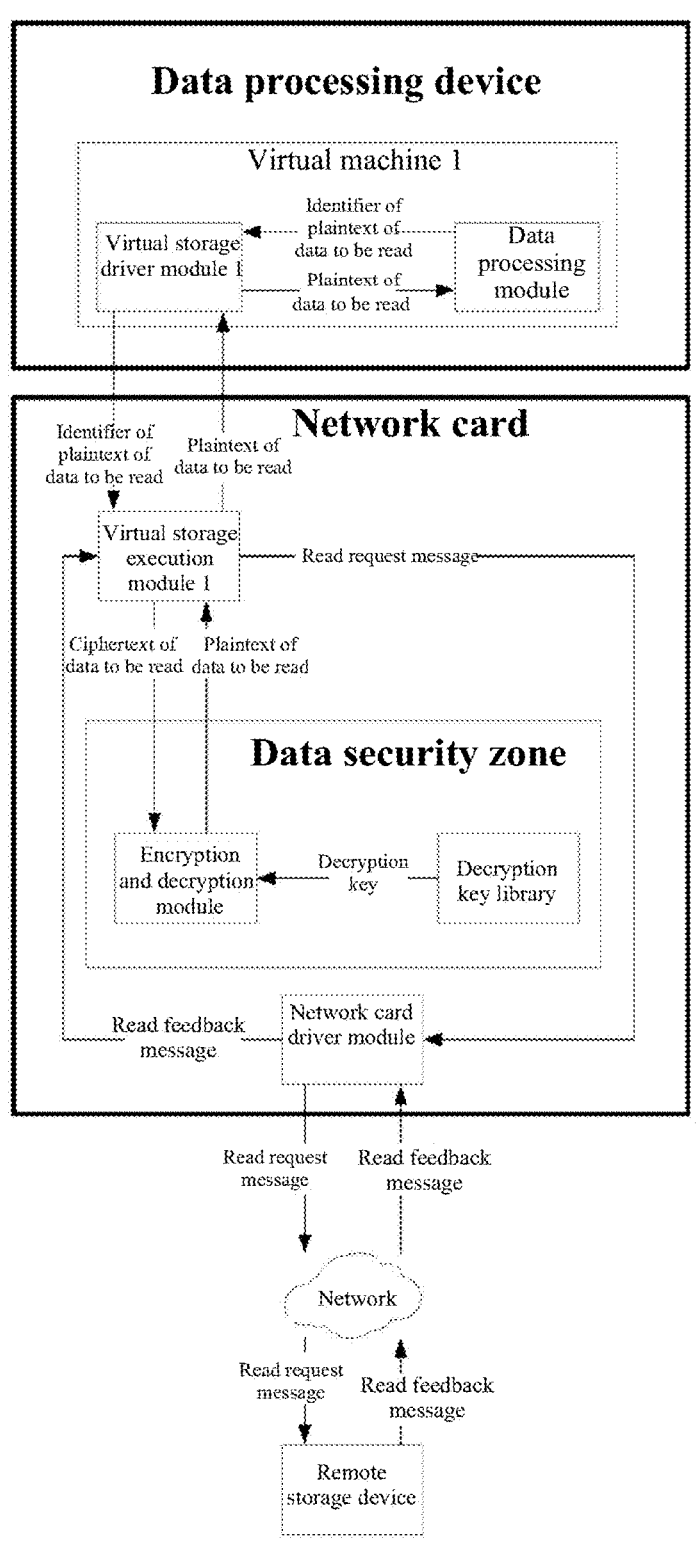
FIG. 3 is a schematic diagram of the principle of reading data in a data storage method provided in an embodiment of the present specification.

For easier understanding, as shown in FIG. 3, it is a schematic diagram of the principle of reading data in a data storage method provided in an embodiment of the present specification.

Among others, the data processing device is deployed with virtual machines 1-3, each of which includes a data processing module and a virtual storage driver module.

A network card of the data processing device includes a virtual storage execution module 1-3, an encryption and decryption module, an encryption and decryption key library and a network card driver module.

The virtual storage execution modules 1-3 can correspond one to one with the virtual machines 1-3. The network card also has a data security zone, and the encryption and decryption module and the encryption and decryption key library are deployed in the data security zone.

In addition to the data processing device, there is also a remote storage device.

FIG. 3 shows specific interaction between the modules.

In the above method flow, the data processing module of the virtual machine can send the data to be stored to the remote storage device for storage through the network card of the data processing device where it is located, specifically through the virtual storage execution module in the network card, thereby realizing remote storage and enabling the virtual machine to store data.

In addition, in the above method flow, the data processing device can load a special network card and use the virtual storage execution module in the network card to share the task of remote data storage for the virtual machine, so that the data processing module of the virtual machine can focus on performing its own data processing task, which can save the computing resources of the virtual machine, improve data processing efficiency, and improve the user's experience of using data processing services.

In addition, data encryption can be further performed through the virtual storage execution module on the network card to take on the data encryption task of the virtual machine, further saving the computing resources of the virtual machine, thereby achieving disk encryption and transmission encryption and improving the security of data in remote storage and during data transmission without increasing the computing resource burden of the virtual machine.

Since the data transmitted in the network is in ciphertext form, no additional encryption operations need to be performed during the data transmission process. For example, there is no need to perform additional transmission encryption through IPsec, etc., which can improve the efficiency of data transmission. In addition, the data stored in the external storage device is also in encrypted form. Devices that do not have the corresponding decryption key cannot obtain the plaintext of the data, thereby improving the security of the data in the remote storage process without increasing the burden on the virtual machine.

In addition, the remote storage device can directly store the received ciphertext of the data without other processing, and has good scalability.

The security of encryption keys and decryption keys can also be improved through the data security zone in the network card. Specifically, the encryption keys and decryption keys can be protected from appearing in plaintext in the memory and CPU cache.

Corresponding to the above method embodiments, the embodiments of the present specification also provide an embodiment of a data processing device and a network card.

A data processing device, wherein at least one virtual machine is deployed on the data processing device, each virtual machine includes a data processing module and a virtual storage driver module, the virtual storage driver module is configured to drive a virtual storage execution module corresponding to the virtual machine, and the virtual storage execution module is bound to a non-local remote storage device; a network card of the data processing device includes a network card driver module, an encryption module and the virtual storage execution module corresponding to each virtual machine.

The data processing module in any of the virtual machines is configured to send plaintext of data to be stored to the virtual storage driver module in the virtual machine.

The virtual storage driver module is configured to send the identification information of the plaintext of the data to be read to the virtual storage execution module corresponding to the virtual machine.

The virtual storage execution module is configured to send the plaintext of the data to be stored to the encryption module.

The encryption module, configured to encrypt the plaintext of the data to be stored and send obtained ciphertext of the data to be stored back to the virtual storage execution module.

The virtual storage execution module is configured to construct a storage message using the ciphertext of the data to be stored as a message payload and a communication address of a bound remote storage device as a message destination address, and send the storage message to the network card driver module for network transmission, to store the ciphertext of the data to be stored in the remote storage device.

Figures 4, 5:
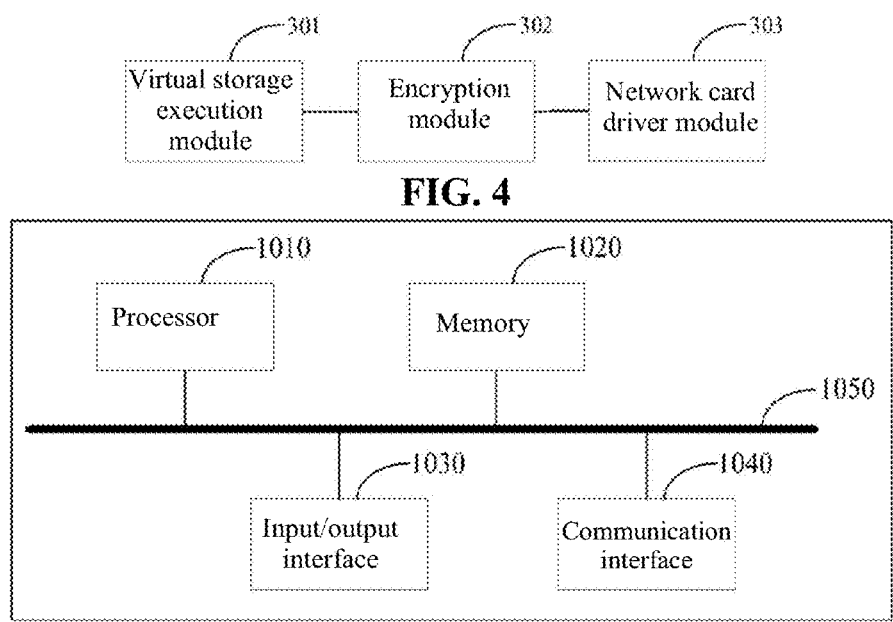
FIG. 4 is a schematic diagram of the structure of a network card provided in an embodiment of the present specification.
FIG. 5 is a schematic diagram of the structure of a device for configuring a method according to an embodiment of the present specification.

As shown in FIG. 4, it is a schematic diagram of the structure of a network card provided in an embodiment of the present specification.

Among others is a network card loaded on a data processing device, wherein at least one virtual machine is deployed on the data processing device, each virtual machine includes a data processing module and a virtual storage driver module, the virtual storage driver module is configured to drive a virtual storage execution module corresponding to the virtual machine, and the virtual storage execution module is bound to a non-local remote storage device; the network card includes a network card driver module 303, an encryption module 302 and a virtual storage execution module 301 corresponding to each virtual machine.

The data processing module in any virtual machine is configured to send plaintext of data to be stored to the virtual storage driver module in the virtual machine.

The virtual storage driver module is configured to send the identification information of the plaintext of the data to be read to the virtual storage execution module 301 corresponding to the virtual machine.

The virtual storage execution module 301 is configured to send the plaintext of the data to be stored to the encryption module.

The encryption module 302 is configured to encrypt the plaintext of the data to be stored and send obtained ciphertext of the data to be stored back to the virtual storage execution module.

The virtual storage execution module 301 is configured to construct a storage message using the ciphertext of the data to be stored as a message payload and a communication address of a bound remote storage device as a message destination address, and send the storage message to the network card driver module 303 for network transmission, to store the ciphertext of the data to be stored in the remote storage device.

For specific explanation of the above-mentioned embodiments of the data processing device and the above-mentioned embodiments of the network card, reference can be made to the above embodiments of the method.

FIG. 5 shows a more specific schematic diagram of the hardware structure of a computer device provided in an embodiment of the present specification. The device can include: a processor 1010, a memory 1020, an input/output interface 1030, a communication interface 1040 and a bus 1050. The processor 1010, the memory 1020, the input/output interface 1030 and the communication interface 1040 are connected to each other in communication within the device via the bus 1050.

The processor 1010 can be implemented by a general-purpose CPU (Central Processing Unit), a microprocessor, an application-specific integrated circuit (ASIC), or one or more integrated circuits, and is used to execute relevant programs to implement the technical solutions provided in the embodiments of the present specification.

The memory 1020 can be implemented in the form of ROM (Read Only Memory), RAM (Random Access Memory), static storage device, dynamic storage device, etc. The memory 1020 can store an operating system and other application programs. When the technical solutions provided in the embodiments of the present specification are implemented by software or firmware, relevant program codes are stored in the memory 1020 and are called and executed by the processor 1010.

The input/output interface 1030 is used to connect the input/output module to realize information input and output. The input/output/module can be configured as a component in the device (not shown in the figure), or it can be externally connected to the device to provide corresponding functions. The input devices can include a keyboard, a mouse, a touch screen, a microphone, various sensors, etc., and the output devices can include a display, a speaker, a vibrator, an indicator light, etc.

The communication interface 1040 is used to connect to a communication module (not shown in the figure) to achieve communication interaction between the device and other devices. Among others, the communication module can achieve communication through a wired method (such as USB, network cable, etc.) or a wireless method (such as mobile network, WIFI, Bluetooth, etc.).

The bus 1050 includes a path that transmits information between the various components of the device (e.g., the processor 1010, the memory 1020, the input/output interface 1030, and the communication interface 1040).

It should be noted that, although the above device only shows the processor 1010, the memory 1020, the input/output interface 1030, the communication interface 1040 and the bus 1050, in the specific implementation process, the device can also include other components necessary for achieving normal operation. In addition, it can be appreciated by those skilled in the art that the above-mentioned device can also include only the components necessary to implement the embodiments of the present specification, and does not necessarily include all components shown in the figure.

The embodiments of the present specification also provide a computer-readable storage medium having a computer program stored thereon which, when executed by a processor, performs the steps by a processing module and/or a network card driver module in a data transmission method.

The embodiments of the present specification also provide a computer-readable storage medium having a computer program stored thereon, which, when executed by a processor, implements functions of the data processing module, or the network card driver module, or the virtual storage driver module, or the virtual storage execution module, or the encryption module in the above embodiments of the method.

The computer-readable medium includes both permanent and non-permanent, removable and non-removable media that can implement information storage by any method or technology. The information can be a computer-readable instruction, a data structure, a program module or other data. Examples of the computer storage medium include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read-only memory (CD-ROM), digital versatile disk (DVD) or other optical storage, magnetic cassettes, magnetic disk storage or other magnetic storage devices, or any other non-transmission medium that can be used to store information that can be accessed by a computing device. According to the definition herein, the computer-readable medium does not include temporary computer-readable media (transitory media), such as modulated data signals and carrier waves.

It can be seen from the above description of the implementation that those skilled in the art can unambiguously appreciate that the embodiments of the present specification can be implemented by means of software plus a necessary general hardware platform. Based on this understanding, the technical solutions of the embodiments of the present specification essentially, or in other words, the part that contributes to the existing technology, can be embodied in the form of a software product. The computer software product can be stored in a storage medium, such as ROM/RAM, a disk, an optical disk, etc., and includes a number of instructions for causing a computer device (which can be a personal computer, a server, or a network device, etc.) to execute the method described in each embodiment or certain parts of the embodiments of the present specification.

The systems, devices, modules or units described in the above embodiments may be implemented by computer chips or entities, or by products with certain functions. A typical implementation device is a computer, which may be in the specific form of a personal computer, a laptop computer, a cellular phone, a camera phone, a smart phone, a personal digital assistant, a media player, a navigation device, an email sending and receiving device, a game console, a tablet computer, a wearable device, or a combination of any several of these devices.

In the above technical solutions, the data processing module of the virtual machine can send the data to be stored to the remote storage device for storage through the network card of the data processing device where it is located, specifically through the virtual storage execution module in the network card, thereby realizing remote storage and enabling the virtual machine to store data.

The various embodiments in the present specification are all described in a progressive manner, and the same or similar parts between the various embodiments can be referenced to each other. Each embodiment focuses on the differences from other embodiments. In particular, for the embodiments of the device, since it is basically similar to the embodiments of the method, the description is relatively simple, and the relevant parts can be referred to the partial description of the embodiments of the method. The above embodiments of the device are merely illustrative, wherein the modules described as separate components may or may not be physically separated, and when implementing the embodiments of the present specification, the functions of each module can be implemented in the same or multiple software and/or hardware. It is also possible to select some or all of the modules according to actual needs to achieve the purpose of the solution in the present embodiment. A person skilled in the art can understand and implement the present invention without any inventive effort.

The above is only a specific implementation of the embodiments of the present specification. It should be pointed out that for a person having ordinary skill in the art, several improvements and modifications can be made without departing from the principles of the embodiments of the present specification. These improvements and modifications should also be regarded as protection for the embodiments of the present specification.

What is claimed is:

1. A data storage method, wherein at least one virtual machine is deployed on a data processing device, each virtual machine comprises a data processing module and a virtual storage driver module, the virtual storage driver module is configured to drive a virtual storage execution module corresponding to the virtual machine, wherein different virtual machines correspond one-to-one to different virtual storage execution modules, and the virtual storage execution module is bound to a non-local remote storage device; a network card of the data processing device comprises a network card driver module, an encryption module and the virtual storage execution module corresponding to each virtual machine, the method comprising:

sending, by the data processing module of any virtual machine, plaintext of data to be stored to the virtual storage driver module in the virtual machine;

sending, by the virtual storage driver module, the plaintext of the data to be stored to the virtual storage execution module corresponding to the virtual machine;

sending, by the virtual storage execution module, the plaintext of the data to be stored to the encryption module;

encrypting, by the encryption module, the plaintext of the data to be stored, and sending obtained ciphertext of the data to be stored back to the virtual storage execution module, wherein the encrypting is performed by using an encryption key specific to the virtual machine, different virtual machines correspond one-to-one to different encryption keys; and constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

2. The method as claimed in claim 1, wherein at least two virtual machines are deployed on the data processing device; wherein encrypting, by the encryption module, the plaintext of the data to be stored comprises:

encrypting, by the encryption module, the plaintext of the data to be stored using an encryption key specific to the virtual machine.

3. The method as claimed in claim 1, wherein the network card has a data security zone at a hardware level, and an encryption key used by the encryption module is stored in the data security zone.

4. The method as claimed in claim 3, wherein the encryption module is deployed in the data security zone.

5. The method as claimed in claim 4, in a case where any virtual machine needs to be migrated from the data processing device to another data processing device, the method further comprises:

sending, by the data processing module in the virtual machine, a migration notification to the virtual storage driver module in the virtual machine;

sending, by the virtual storage driver module, the migration notification to the virtual storage execution module corresponding to the virtual machine;

sending, by the virtual storage execution module, a key migration instruction to the encryption module according to the migration notification;

encrypting, by the encryption module, a key corresponding to the virtual machine stored in the data security zone; and constructing, by the encryption module, a key migration message using an encrypted key as a message payload and a communication address of another encryption module in a network card of the other data processing device to be migrated as a destination address, and sending the key migration message over network, facilitating decryption by the other encryption module to obtain the key.

6. The method as claimed in claim 1, wherein the virtual storage execution module being bound to the non-local remote storage device comprises:

the virtual storage execution module being bound to a target storage space on the non-local remote storage device;

wherein the message payload of the storage message further comprises an address of the target storage space, to facilitate storage of the ciphertext of the data to be stored in the target storage space.

7. The method as claimed in claim 1, wherein the encryption module is an encryption and decryption module, the method further comprises:

sending, by the data processing module in any virtual machine, identification information corresponding to plaintext of data to be read to the virtual storage driver module in the virtual machine;

sending, by the virtual storage driver module, the identification information of the plaintext of the data to be read to the virtual storage execution module corresponding to the virtual machine;

determining, by the virtual storage execution module, identification information of corresponding ciphertext of the data to be read according to the identification information of the plaintext of the data to be read;

constructing, by the virtual storage execution module, a read request message using the identification information of the ciphertext of the data to be read as a message payload and the communication address of the bound remote storage device as the message destination address, and sending the read request message to the network card driver module for network transmission;

receiving, by the virtual storage execution module, a read feedback message sent by the network card driver module, wherein the read feedback message is constructed by the remote storage device and sent over network, and the message payload of the read feedback message comprises the ciphertext of the data to be read;

sending, by the virtual storage execution module, the ciphertext of the data to be read to the encryption and decryption module;

decrypting, by the encryption and decryption module, the ciphertext of the data to be read and sending obtained plaintext of the data to be read back to the virtual storage execution module;

sending, by the virtual storage execution module, the plaintext of the data to be read to the virtual storage driver module; and sending, by the virtual storage driver module, the plaintext of the data to be read to the data processing module.

8. The method as claimed in claim 7, wherein at least two virtual machines are deployed on the data processing device; wherein the decrypting, by the encryption and decryption module, the ciphertext of the data to be read comprises:

decrypting, by the encryption and decryption module, the ciphertext of the data to be read by using a decryption key specific to the virtual machine.

9. The method as claimed in claim 7, wherein the network card has a data security zone at a hardware level, and the decryption key used by the encryption and decryption module is stored in the data security zone.

10. A data processing device, wherein at least one virtual machine is deployed on the data processing device, each virtual machine comprises a data processing module and a virtual storage driver module, the virtual storage driver module is configured to drive a virtual storage execution module corresponding to the virtual machine, wherein different virtual machines correspond one-to-one to different virtual storage execution modules, and the virtual storage execution module is bound to a non-local remote storage device; a network card of the data processing device comprises a network card driver module, an encryption module and the virtual storage execution module corresponding to each virtual machine;

wherein the data processing device further comprises a processor and a memory, the memory stores computer-readable instructions which, when executed by the processor, cause the processor to perform operations of:

sending, by the data processing module of any virtual machine, plaintext of data to be stored to the virtual storage driver module in the virtual machine;

sending, by the virtual storage driver module, the plaintext of the data to be stored to the virtual storage execution module corresponding to the virtual machine;

sending, by the virtual storage execution module, the plaintext of the data to be stored to the encryption module;

encrypting, by the encryption module, the plaintext of the data to be stored, and sending obtained ciphertext of the data to be stored back to the virtual storage execution module, wherein the encrypting is performed by using an encryption key specific to the virtual machine, different virtual machines correspond one-to-one to different encryption keys; and constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

11. A network card loaded on a data processing device, wherein at least one virtual machine is deployed on the data processing device, each virtual machine comprises a data processing module and a virtual storage driver module, the virtual storage driver module is configured to drive a virtual storage execution module corresponding to the virtual machine, wherein different virtual machines correspond one-to-one to different virtual storage execution modules, and the virtual storage execution module is bound to a non-local remote storage device; the network card comprises a network card driver module, an encryption module and the virtual storage execution module corresponding to each virtual machine;

wherein the network card further comprises a processor and a memory, the memory stores computer-readable instructions which, when executed by the processor, cause the processor to perform operations of:

sending, by the data processing module of any virtual machine, plaintext of data to be stored to the virtual storage driver module in the virtual machine;

sending, by the virtual storage driver module, the plaintext of the data to be stored to the virtual storage execution module corresponding to the virtual machine;

sending, by the virtual storage execution module, the plaintext of the data to be stored to the encryption module;

encrypting, by the encryption module, the plaintext of the data to be stored, and sending obtained ciphertext of the data to be stored back to the virtual storage execution module, wherein the encrypting is performed by using an encryption key specific to the virtual machine, different virtual machines correspond one-to-one to different encryption keys; and constructing, by the virtual storage execution module, a storage message using the ciphertext of the data to be stored as a message payload and a communication address of a bound remote storage device as a message destination address, and sending the storage message to the network card driver module for network transmission, to store the ciphertext of the data to be stored in the remote storage device.

12. A non-transitory computer-readable storage medium having a computer program stored thereon which, when executed by a processor, implements functions of the data processing module, the network card driver module, the virtual storage driver module, the virtual storage execution module, or the encryption module of the method as claimed in claim 1.

13. The non-transitory computer-readable storage medium of claim 12, wherein the computer program, when executed by the processor, implements functions of the data processing module, the network card driver module, the virtual storage driver module, the virtual storage execution module, or the encryption module, wherein at least two virtual machines are deployed on the data processing device, and wherein encrypting, by the encryption module, the plaintext of the data to be stored comprises encrypting the plaintext of the data to be stored using an encryption key specific to the virtual machine.

14. The non-transitory computer-readable storage medium as claimed in claim 12, wherein the computer program, when executed by the processor, implements functions of the data processing module, the network card driver module, the virtual storage driver module, the virtual storage execution module, or the encryption module wherein the network card has a data security zone at a hardware level, and an encryption key used by the encryption module is stored in the data security zone.

15. The non-transitory computer-readable storage medium as claimed in claim 12, wherein the computer program, when executed by the processor, implements functions of the data processing module, the network card driver module, the virtual storage driver module, the virtual storage execution module, or the encryption module, wherein the encryption module is deployed in the data security zone.

16. The non-transitory computer-readable storage medium as claimed in claim 12, wherein the computer program, when executed by the processor, implements functions of the data processing module, the network card driver module, the virtual storage driver module, the virtual storage execution module, or the encryption module, whereby in a case where any virtual machine needs to be migrated from the data processing device to another data processing device, the data processing module in the virtual machine sends a migration notification to the virtual storage driver module in the virtual machine;

the virtual storage driver module sends the migration notification to the virtual storage execution module corresponding to the virtual machine;

the virtual storage execution module sends a key migration instruction to the encryption module according to the migration notification;

the encryption module encrypts a key corresponding to the virtual machine stored in the data security zone; and the encryption module constructs a key migration message using an encrypted key as a message payload and a communication address of another encryption module in a network card of the other data processing device to be migrated as a destination address, and sending the key migration message over network, facilitating decryption by the other encryption module to obtain the key.

17. The non-transitory computer-readable storage medium as claimed in claim 12, wherein the computer program, when executed by the processor, implements functions of the data processing module, the network card driver module, the virtual storage driver module, the virtual storage execution module, or the encryption module, wherein the virtual storage execution module being bound to the non-local remote storage device comprises:

the virtual storage execution module being bound to a target storage space on the non-local remote storage device;

wherein the message payload of the storage message further comprises an address of the target storage space, to facilitate storage of the ciphertext of the data to be stored in the target storage space.

18. The non-transitory computer-readable storage medium as claimed in claim 12, wherein the computer program, when executed by the processor, implements functions of the data processing module, the network card driver module, the virtual storage driver module, the virtual storage execution module, or the encryption module, wherein the encryption module is an encryption and decryption module, whereby:

the data processing module in any virtual machine sends identification information corresponding to plaintext of data to be read to the virtual storage driver module in the virtual machine;

the virtual storage driver module sends the identification information of the plaintext of the data to be read to the virtual storage execution module corresponding to the virtual machine;

the virtual storage execution module determines identification information of corresponding ciphertext of the data to be read according to the identification information of the plaintext of the data to be read;

the virtual storage execution module constructs a read request message using the identification information of the ciphertext of the data to be read as a message payload and the communication address of the bound remote storage device as the message destination address, and sending the read request message to the network card driver module for network transmission;

the virtual storage execution module receives a read feedback message sent by the network card driver module, wherein the read feedback message is constructed by the remote storage device and sent over network, and the message payload of the read feedback message comprises the ciphertext of the data to be read;

the virtual storage execution module sends the ciphertext of the data to be read to the encryption and decryption module;

the encryption and decryption module decrypts the ciphertext of the data to be read and sending obtained plaintext of the data to be read back to the virtual storage execution module;

the virtual storage execution module sends the plaintext of the data to be read to the virtual storage driver module; and the virtual storage driver module sends the plaintext of the data to be read to the data processing module.

19. The non-transitory computer-readable storage medium as claimed in claim 12, wherein the computer program, when executed by the processor, implements functions of the data processing module, the network card driver module, the virtual storage driver module, the virtual storage execution module, or the encryption module, wherein the encryption module is an encryption and decryption module;

the data processing module in any virtual machine sends identification information corresponding to plaintext of data to be read to the virtual storage driver module in the virtual machine;

the virtual storage driver module sends the identification information of the plaintext of the data to be read to the virtual storage execution module corresponding to the virtual machine;

the virtual storage execution module determines identification information of corresponding ciphertext of the data to be read according to the identification information of the plaintext of the data to be read;

the virtual storage execution module constructs a read request message using the identification information of the ciphertext of the data to be read as a message payload and the communication address of the bound remote storage device as the message destination address, and sending the read request message to the network card driver module for network transmission;

the virtual storage execution module receives a read feedback message sent by the network card driver module, wherein the read feedback message is constructed by the remote storage device and sent over network, and the message payload of the read feedback message comprises the ciphertext of the data to be read;

the virtual storage execution module sends the ciphertext of the data to be read to the encryption and decryption module;

the encryption and decryption module decrypts the ciphertext of the data to be read and sends obtained plaintext of the data to be read back to the virtual storage execution module;

the virtual storage execution module sends the plaintext of the data to be read to the virtual storage driver module; and the virtual storage driver module sends the plaintext of the data to be read to the data processing module.

20. The non-transitory computer-readable storage medium as claimed in claim 12, wherein the computer program, when executed by the processor, implements functions of the data processing module, the network card driver module, the virtual storage driver module, the virtual storage execution module, or the encryption module, wherein the network card has a data security zone at a hardware level, and the decryption key used by the encryption and decryption module is stored in the data security zone.

* * * * *